US010795517B2

(12) United States Patent
Zhou et al.

(10) Patent No.: US 10,795,517 B2
(45) Date of Patent: Oct. 6, 2020

(54) METHOD AND APPARATUS FOR POSITIONING FINGER ON TOUCH PANEL IN WET STATE, AND TOUCH DETECTION APPARATUS

(71) Applicant: SHENZHEN GOODIX TECHNOLOGY CO., LTD., Shenzhen (CN)

(72) Inventors: Wei Zhou, Shenzhen (CN); Wingho Pang, Shenzhen (CN); Yejia Feng, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 95 days.

(21) Appl. No.: 16/168,805

(22) Filed: Oct. 23, 2018

(65) Prior Publication Data

US 2019/0056826 A1 Feb. 21, 2019

Related U.S. Application Data

(63) Continuation of application No. PCT/CN2017/093281, filed on Jul. 18, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01);
(Continued)

(58) Field of Classification Search
CPC .... G06F 3/044; G06F 3/0446; G06F 3/04186; G06F 3/041662; G06F 3/0418; G06F 3/0416
See application file for complete search history.

(56) References Cited

U.S. PATENT DOCUMENTS 8,773,146 B1 7/2014 Hills et al.
2011/0169751 A1 7/2011 Kim et al.
(Continued)

FOREIGN PATENT DOCUMENTS

CN 104133600 A 11/2014
CN 105573570 A 5/2016
(Continued)

*Primary Examiner* — Alexander Eisen
*Assistant Examiner* — Kebede T Teshome

(57) ABSTRACT

A method and apparatus for positioning a finger on a touch panel in a wet state and a touch detection apparatus are provided. The method includes: searching out suspect wet regions on the touch panel in a spacing coding manner, and determining a wet region from the suspect wet regions in a self-capacitive coding manner; traversing detection channels in the self-capacitive coding manner, and judging whether the detection channels satisfy a first condition; and if the detection channels in the wet region satisfy the first condition, determining a relative position relationship between a touch position of a finger and the wet region according to variations of feature data differences of the detection channels on the entire touch panel; or determining a relative position relationship between a touch position of a finger and the wet region according to variations of feature data differences of the detection channels outside the wet region.

18 Claims, 6 Drawing Sheets

Search out suspect wet regions in a spacing coding manner, and determine a wet region from the suspect wet regions in a self-capacitive coding manner — 201

Traverse detection channels on the entire touch panel in the self-capacitive coding manner — 202

Do the detection regions of the detection channels in the wet region satisfy a first condition? — 203

Yes → 204: Determine a relative position relationship between a touch position of the finger and the wet region according to the variations of the feature data differences of the detection channels in the wet region No → 205: Determine the relative position relationship between the touch position of the finger and the wet region according to the variations of the feature data differences of the detection channels outside the wet region

(52) U.S. Cl.
CPC ........ *G06F 3/0446* (2019.05); *G06F 3/04186* (2019.05); *G06F 3/041662* (2019.05)

(56) References Cited

U.S. PATENT DOCUMENTS

| | | | | |
|---|---|---|---|---|
| 2015/0346864 | A1* | 12/2015 | Yang | G06F 3/044 345/174 |
| 2016/0062533 | A1 | 3/2016 | O'Connor | |
| 2016/0282980 | A1* | 9/2016 | Chintalapoodi | G06F 3/0416 |

FOREIGN PATENT DOCUMENTS

| | | | |
|---|---|---|---|
| CN | 105630256 | A | 6/2016 |
| EP | 2950191 | A1 | 12/2015 |

* cited by examiner

| 35 |
|---|
| -22 |
| 50 |
| -40 |
| 48 |

METHOD AND APPARATUS FOR POSITIONING FINGER ON TOUCH PANEL IN WET STATE, AND TOUCH DETECTION APPARATUS

CROSS-REFERENCE TO RELATED APPLICATIONS

The present disclosure is a continuation of international application No. PCT/CN2017/093281, filed on Jul. 18, 2017, which is hereby incorporated by reference in its entireties.

TECHNICAL FIELD

Embodiments of the present application relate to the field of touch technologies, and in particular, relate to a finger positioning method and apparatus on a touch panel in a wet state, and a touch detection apparatus.

BACKGROUND

The touch technology, when applied to a smart terminal, enables a user to operate the terminal only by means of gesture operations. As such, a traditional mechanical keyboard is not needed, such that man-machine interaction is simpler and more direct. The touch technology may be categorized based on the induction principle into: resistive touch technology, capacitive touch technology, surface acoustic wave touch technology, and optics touch technology. At present, the capacitive touch technology is most commonly used on the smart terminals.

A capacity touch panel (CTP) that embodies the capacitive touch technology operates based on current induction of a human body. When a user touches the CTP, due to the electric field of the human body, a finger of the user forms a coupling capacitor with a working surface of the CTP, and a series of touch operation functions are implemented by detecting the capacitance value of the coupling capacitor.

At present, a projected capacitive touch panel is mostly widely used on the smart terminals. In the projected capacitive touch panel, upper and lower electrodes are respectively arranged across the X-axis and the Y-axis and thus a capacitor array is formed. When the finger touches the touch panel, capacitance variations at the touch position may be detected by scanning along the X-axis and the Y-axis, and thus the touch position of the finger may be calculated, based on which a series of touch operation functions are implemented.

With the development of the man-machine interface technology, the capacitive touch technology has been widely applied because of comfort and convenience of the operations thereof, and the capacitive touch panels are also more and more widely used. In addition, stricter and stricter requirements are being imposed on the application scenario. If a small amount of water resides on the touch panel, or a terminal device with the touch panel is carried from outdoor environments to indoor environments and thus a layer water mist is formed on the touch panel thereof due to variation of air temperatures, a wet region is formed, which affects the normal operations of the touch panel. In the prior art, a relative position relationship between the finger and the wet region may not be determined, and thus accurate responses may not be made to the touch position of the finger in the wet state.

SUMMARY

In view of the above, embodiments of the present application are intended to provide a finger positioning method and apparatus on a touch panel in a wet state, and a touch detection apparatus, to address the defect that a relative position relationship between a finger and a wet region fails to be determined in the prior art, and to achieve the objective of making accurate responses to a touch region of the finger.

Based on the above objectives, a first aspect of embodiments of the present application provides a finger positioning method on a touch panel in a wet state. The method includes:

searching out a suspect wet region on the touch panel in a spacing coding manner, and determining a wet region from the suspect wet region in a self-capacitive coding manner;

traversing detection channels on the entire touch panel in the self-capacitive coding manner, and judging whether the detection channels in the wet region satisfy a first condition; and if the detection channels in the wet region satisfy the first condition, determining a relative position relationship between a touch position of a finger and the wet region according to variations of feature data differences of the detection channels on the entire touch panel; or if the detection channels in the wet region do not satisfy the first condition, determine a relative position relationship between a touch position of a finger and the wet region according to variations of feature data differences of the detection channels outside the wet region.

Based on the above objectives, a second aspect of embodiments of the present application provides a finger positioning apparatus on a touch panel in a wet state. The apparatus includes: a wet region determining module, a condition judging module and a finger positioning module; where the wet region determining module is configured to search out a suspect wet region in a spacing coding manner, and determine a wet region from the suspect wet region in a self-capacitive coding manner;

the condition judging module is configured to traverse detection channels on the entire touch panel in the self-capacitive coding manner, and judge whether the detection channels in the wet region satisfy a first condition; and the finger positioning module is configured to: if the detection channels in the wet region satisfy the first condition, determine a relative position relationship between a touch position of a finger and the wet region according to variations of feature data differences of the detection channels on the entire touch panel; or if the detection channels in the wet region do not satisfy the first condition, determine a relative position relationship between a touch position of a finger and the wet region according to variations of feature data differences of the detection channels outside the wet region.

Based on the above objectives, a third aspect of embodiments of the present application provides a touch detection apparatus. The apparatus includes: a touch chip and a capacitor array network; where the touch chip is configured to: search out a suspect wet region in a spacing coding manner, and determine a wet region from the suspect wet region in a self-capacitive coding manner;

traverse detection channels on the capacitor array network in the self-capacitive coding manner, and judge whether the detection channels in the wet region satisfy a first condition; and if the detection channels in the wet region satisfy the first condition, determining a relative position relationship between a touch position of a finger and the wet region according to variations of feature data differences of the detection channels on the entire touch panel; or if the detection channels in the wet region do not satisfy the first condition, determine a relative position relationship between a touch position of a finger and the wet region according to variations of feature data differences of the detection channels outside the wet region.

As known from the above technical solutions, in the finger positioning method on a touch panel in a wet state according to embodiments of the present application, whether a touch panel is in a wet state is judged; if the touch panel is in the wet state, a wet region on the touch panel is determined; and a relative position relationship between a finger and the wet region is determined according to variations of feature data differences of detection channels in the wet region in the wet state and variations of feature data differences of detection channels outside the wet region on the touch panel. In this way, a basis is provided for improvement of normal operations by the finger in the wet state, such that accurate responses may be made to touches by the finger in the wet state.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein.

DETAILED DESCRIPTION

To make a person skilled in the art better understand the technical solutions of the embodiments of the present application, the technical solutions of the present application are clearly and completely described with reference to the accompanying drawings of the embodiments of the present application. Apparently, the described embodiments are only a part of the embodiments of the present application, rather than the entire embodiments. Based on the embodiments of the present application, all other embodiments derived by persons of ordinary skill in the art without any creative efforts shall fall within the protection scope of the present application.

Figures 1, 2:
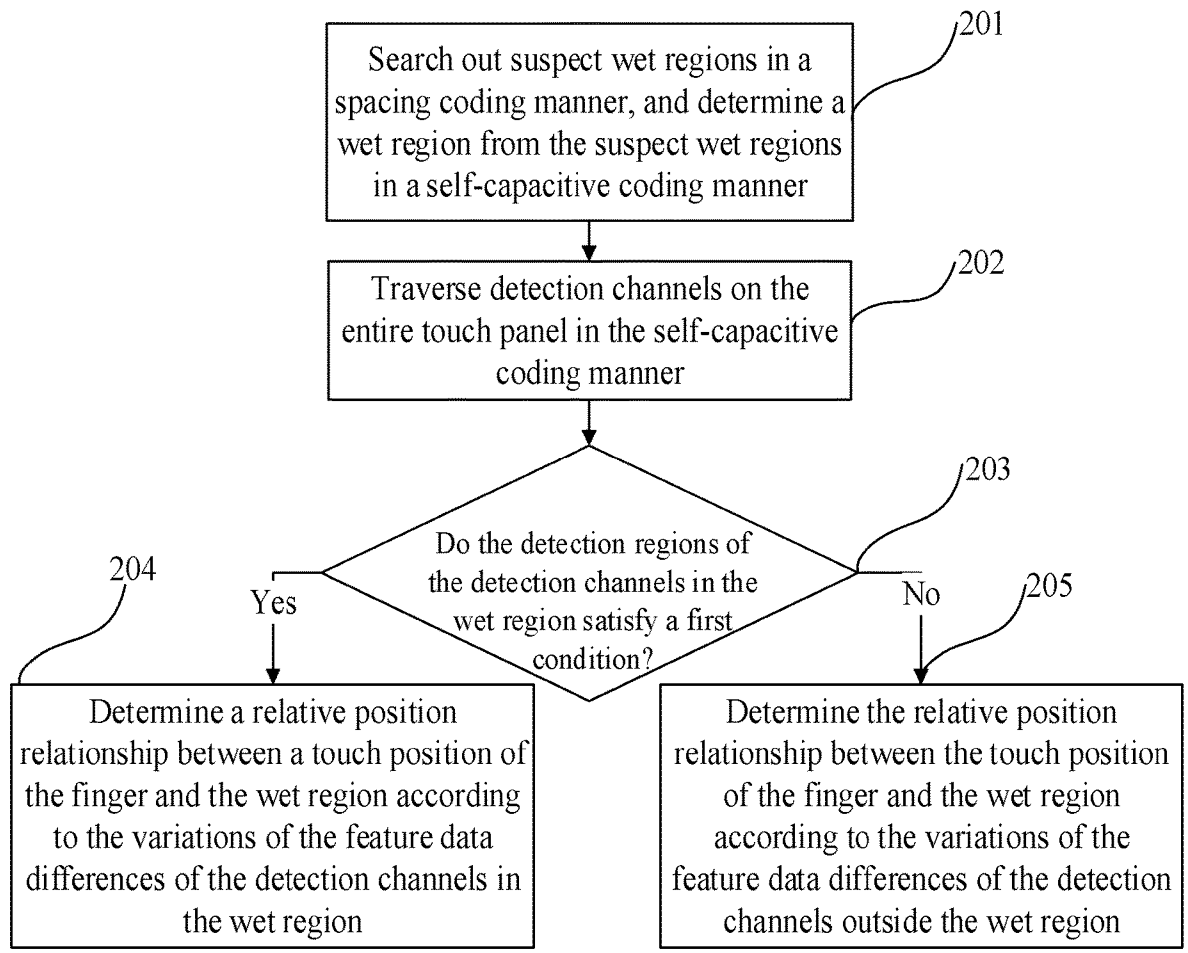
FIG. 1 is a schematic diagram of feature data differences of detection channels satisfying alternate features on a mutual-capacitive touch panel according to an embodiment of the present application.
FIG. 2 is a flowchart of a finger positioning method on a touch panel in a wet state according to a first embodiment of the present application.

During practice of the technical solutions according to the present application, the inventors have found that with respect to a mutual-capacitive touch panel, within a driving cycle, when spacing coding is performed while mutual-capacitive coding is carried out, for example, an odd-numbered drive channel is positively coded while an even-numbered drive channel is not coded within the same driving cycle, or an even-numbered drive channel is positively coded while an odd-numbered drive channel is not coded, feature data differences corresponding to detection channels in a wet region on the touch panel are subject to positive-negative alternate regulative variations. As illustrated in FIG. 1, a schematic diagram of feature data differences of detection channels satisfying alternate features on a mutual-capacitive touch panel according to an embodiment of the present application is given. The feature data difference output by the detection channel corresponding to the drive channel that is positively coded is a positive value, and the feature data difference output by the detection channel corresponding to the drive channel that is not coded is a negative value. The feature data differences may be differences between reference feature data corresponding to the detection channels and real-time feature data.

In the embodiments hereinafter of the present application, a suspect wet region is searched out on a touch panel in a spacing coding manner, and a wet region is determined from the suspect wet region in a self-capacitive coding manner; whether detection channels of the wet region satisfy a first condition is further judged; and if the detection channels in the wet region satisfy the first condition, a relative position relationship between a touch position of a finger and the wet region is determined according to variations of feature data differences of the detection channels in the wet region; or if the detection channels in the wet region do not satisfy the first condition, a relative position relationship between a touch position of a finger and the wet region is determined according to variations of feature data differences of the detection channels outside the wet region. In this way, a basis is provided for the corresponding module to improve normal operations by a finger in the wet state, such that the touch panel is capable of making accurate responses to touches by the finger in the wet state.

Nevertheless, it is not necessary to require that any technical solution according to the embodiments of the present application achieves all of the above technical effects.

The wet region mentioned in the embodiment hereinafter of the present application includes, but not limited to, a region on the touch panel where water droplets are landed, or a region on the touch screen where moisture is condensed due to temperature variations, or a region that is wet due to any other causes, for example, sweat. It should be noted that this embodiment is only intended to exemplarily illustrate the principle of the present application, and determinations on a relative position relationship between other liquids causing similar impacts as water, and the finger shall also be considered as falling within the protection scope of the present application.

As illustrated in FIG. 2, a flowchart of a finger positioning method on a touch panel in a wet state according to a first embodiment of the present application is given. This embodiment includes the following steps:

S201: A suspect wet region is searched out in a spacing coding manner, and a wet region is determined from the suspect wet regions in a self-capacitive coding manner.

In this embodiment, a region responsive to a touch position of the finger that is determined from the suspect wet region is referred to as the wet region.

In this embodiment, a mutual-capacitive touch panel includes drive channels and sensing channels, where a driving signal is applied to the drive channel, that is, the drive channel is coded, and a sensing signal is output by the sensing channel. Therefore, in step S201, the spacing code manner in the mutual-capacitive coding manner may be, for example: within a driving cycle, a positive driving voltage is applied to some of the drive channels while no driving voltage is applied to some of the drive channels. Specifically, as described above, an odd-numbered drive channel is positively coded, an even-numbered drive channel is not coded, and the sensing signal is output by the sensing channel. Accordingly, real-time feature data is generated, and then a difference between reference feature data and the real-time feature data is calculated. The obtained difference is the feature data difference. Afterwards, the suspect wet regions on the touch panel are searched out according to value regulations of the feature data differences.

It should be noted that the drive channels may also be placed into groups, and an odd-numbered group of drive channels are positively coded whereas an even-numbered group of drive channels are not coded.

In this embodiment, as described above, the feature data differences corresponding to the sensing channels in the suspect wet regions are subject to positive-negative alternate regulative variations. However, in the suspect wet regions, some pseudo-wet regions may be present. The pseudo-wet regions include the following cases: Although a region on the touch panel is wet, the accurate responses to the touch positions of the finger on the touch panel are not affected. Therefore, the pseudo-wet regions that do not affect the accurate responses to the touch positions of the finger on the touch panel need to be excluded from the suspect wet regions. Specifically, for example, the touch panel is generally exposed to the air in an application environment, the air generally carries a small amount of vapor, and the touch panel is inevitably in contact with the air, such that the vapor is attached on the touch panel to form the pseudo-wet regions. Therefore, the vapor may cause some impacts onto the feature data differences corresponding to the channels on the touch panel, and thus the feature data differences corresponding to the regions where a small amount of vapor is attached are also subject to regulative variations. However, the regions where a small amount of vapor is attached cause no impact on the accurate responses to the touch positions of the finger on the touch panel, or the impacts may be ignored. Therefore, these pseudo-wet regions need to be excluded from the suspect wet regions, and wet regions that cause impacts onto the responses to the touch positions of the finger need to be determined.

In this embodiment, the reason why the wet region is selected from the suspect wet region in the self-capacitive coding manner may be referenced to the description of FIG. 3 hereinafter.

S202: Detection channels on the entire touch panel are traversed in the self-capacitive coding manner.

In this embodiment, after the wet region on the touch panel is determined in the self-capacitive coding manner in step S201, the detection channel on the entire touch panel are traversed in the self-capacitive coding manner, the obtained feature data differences are compared with the feature data differences obtained in the self-capacitive coding manner in step S201 during the process of determining the wet region from the suspect wet region, to judge whether the feature data differences of the detection channels in the wet region have varied, and to determine a relative position relationship between a touch position of the finger and the wet region in step S203 hereinafter.

In this embodiment, the reason why the self-capacitive coding manner is used in step S202 may be referenced to the description of FIG. 4 hereinafter.

S203: Whether the detection channels in the wet region satisfy a first condition is judged; if the detection channels in the wet region satisfy the first condition, step S204 is performed; and if the detection channels in the wet region do not satisfy the first condition, step S205 is performed.

In this embodiment, the first condition may be traversing the detection channels in the wet region in the self-capacitive coding manner and judging, in the wet region, whether the number of detection channels where the feature data differences satisfy a first threshold is greater than a second threshold. That is, under two self-capacitive coding manners, a magnitude relationship between the number of detection channels, in the wet region, where variation values of the feature data differences reach a predetermined value or value range, and a standard value (that is, the second threshold) is determined.

Under the two self-capacitive coding manners, if the number of detection channels, in the wet region, where the variation values of the feature data differences reach the predetermined value or value range is greater than the standard value, the first condition is satisfied. Under the two self-capacitive coding manners, if the number of detection channels, in the wet region, where the variation values of the feature data differences reach the predetermined value or value range is less than or equal to the standard value, the first condition is not satisfied.

S204: A relative position relationship between a touch position of the finger and the wet region is determined according to the variations of the feature data differences of the detection channels in the wet region.

In this embodiment, before and after the two self-capacitive coding manners, if the finger touches the wet region, if the number of detection channels, in the wet region, where the variation values of the feature data differences reach the predetermined value or value range is greater than the standard value (that is, the second threshold), the detection channels in the wet region satisfy the first condition, and the relative position relationship between the touch position of the finger and the wet region is determined according to a position relationship between the detection channels where the feature data differences vary on the touch panel and the detection channels in the wet region.

In this embodiment, if the finger touches the wet region, when the touch position of the finger is absolutely located in the wet region or partially located in the wet region, the feature data differences of all or a part of the detection channels in the wet region may vary. Therefore, by judging whether the detection channels in the wet region satisfy the first condition, the position relationship between the touch position of the finger if the finger touches the wet region, and the wet region may be determined.

S205: The relative position relationship between the touch position of the finger and the wet region is determined according to variations of feature data differences of the detection channels outside the wet region.

In this embodiment, under the two self-capacitive coding manners, if the number of detection channels, in the wet region, where the variation values of the feature data differences reach the predetermined value or value range is less than or equal to the standard value, that is, the detection channels in the wet region do not satisfy the first condition, it indicates that the touch by the finger is absolutely outside the wet region. Therefore, by judging whether the feature data differences of the detection channels outside the wet region have varied, the relative position relationship between the touch position of the finger and the wet region is determined according to the variations of the feature data differences of the detection channels outside the wet region.

In this embodiment, since the detection channels on the entire touch panel are traversed again in the self-capacitive coding manner in step S202, in the subsequent steps S203 and S204, the variations of the feature data differences of the detection channels on the entire touch panel or the variations of the feature data differences of the detection channels outside the wet region may be obtained based on a traverse result.

In addition, in this embodiment, it is optional in step S202 that the detection channels in the wet region may be only traversed in the self-capacitive coding manner, in the subsequent step S203, the detection channels outside the wet region may be traversed in the self-capacitive coding manner.

Figure 3:
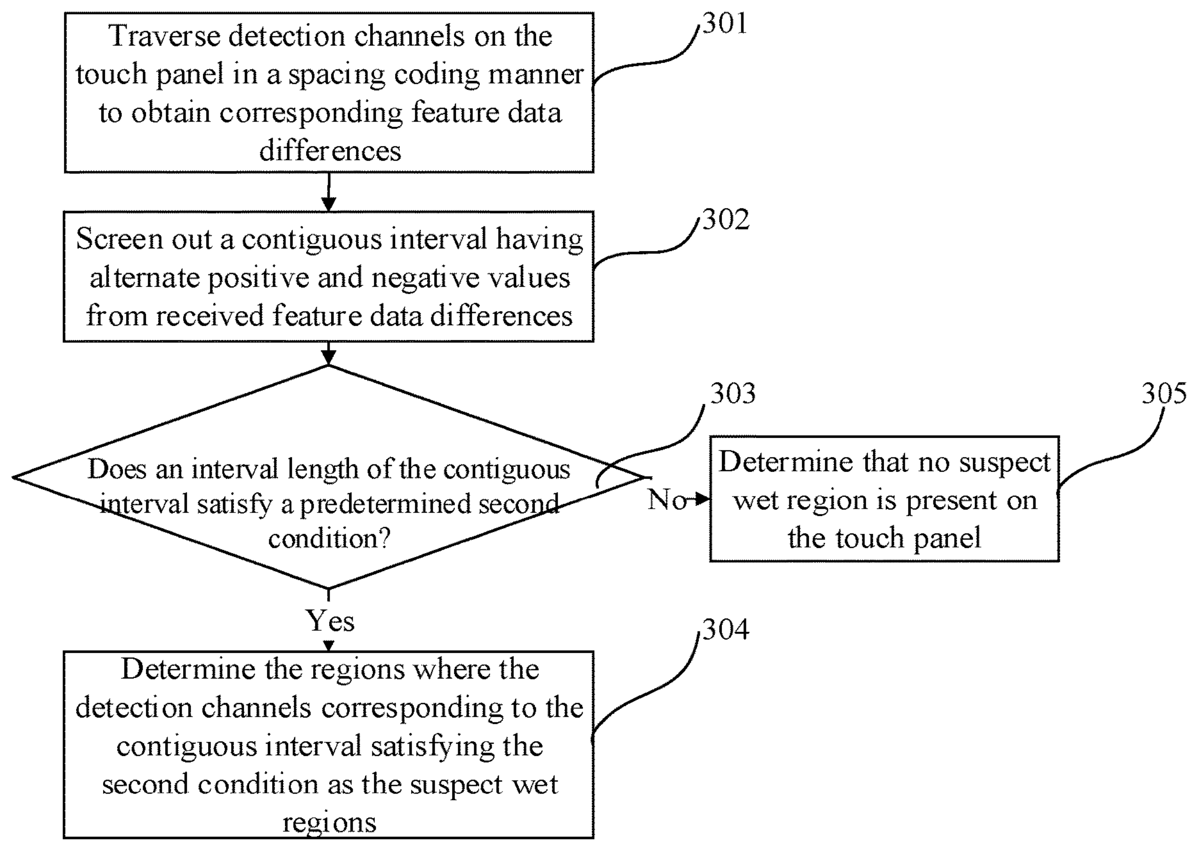
FIG. 3 is a flowchart of a finger positioning method on a touch panel in a wet state according to a second embodiment of the present application.

As illustrated in FIG. 3, a flowchart of a method for determining a suspect wet region on a touch panel according to a second embodiment of the present application is given. This embodiment illustrates how to search out the suspect wet region on the touch panel. The suspect wet region may include the above pseudo-wet regions and/or the above wet regions causing impacts onto the touch by the finger. This embodiment includes the following steps:

S301: Detection channels on the touch panel are traversed in a spacing coding manner to obtain corresponding feature data differences.

In this embodiment, with respect to a mutual-capacitive touch panel, drive channels may be channels along the X-direction or channels along the Y-direction. Specifically, an odd-numbered drive channel on the touch panel may be positively coded whereas an even-numbered drive channel on the touch panel may not be coded, or an even-numbered drive channel on the touch panel may be positively coded whereas an odd-numbered drive channel on the touch panel may not be coded. Real-time feature data is determined according to a sensing signal output by a sensing channel, and the feature data difference is obtained by subtracting reference feature data of the detection channel from the real-time feature data.

S302: A contiguous interval having alternate positive and negative values is screened out from received feature data differences.

In this embodiment, as described above, since in the wet region, an odd-numbered drive channel on the touch panel is positively coded whereas an even-numbered drive channel on the touch panel is not coded, or an even-numbered drive channel on the touch panel is positively coded whereas an odd-numbered drive channel on the touch panel is not coded, the feature data differences corresponding to the detection channels in the wet region are subject to positive-negative alternate variations. After the contiguous interval having alternate positive and negative values is screened out from the feature data differences of all the detection channels, the detection channels corresponding to the feature data differences in the contiguous interval are the detection channels in the suspect wet region on the touch panel.

Optionally, this embodiment further includes screening out a detection channel where an absolute value of the feature data difference is greater than a fifth threshold from the detestation channels corresponding to the received feature data differences. The detection channel where the absolute value of the feature data difference is greater than the fifth threshold may be considered as the detection channel in the suspect wet region. The detection channels where the feature data differences have the alternate positive and negative values are searched for towards two sides with the screened detection channel as a central channel, and a numerical interval of the feature data differences of the detection channels having the alternate positive and negative values is output.

S303: Whether an interval length of the contiguous interval satisfies a predetermined second condition is judged. If the interval length satisfies the predetermined second condition, step S304 is performed; and if the interval length does not satisfy the predetermined second condition, step S305 is performed.

In practical application, if the area of the wet region on the touch panel is too small to cause impacts on the responses to the touches by the finger on the touch panel, the region, that is, the pseudo-wet region is ignored, and the wet region whose area is sufficiently great to cause impacts onto the response to the touch of the finger on the touch panel or the above pseudo-wet region caused by water mist or like is screened out. Therefore, in this embodiment, by statistically collecting the interval length of the contiguous interval, and judging whether the length of the interval is greater than the predetermined value range, the suspect wet region is determined. That is, during determining the suspect wet region, presence of the pseudo-wet region is considered, and some of the pseudo-wet regions are directly excluded during determining the suspect wet regions.

Figure 4:
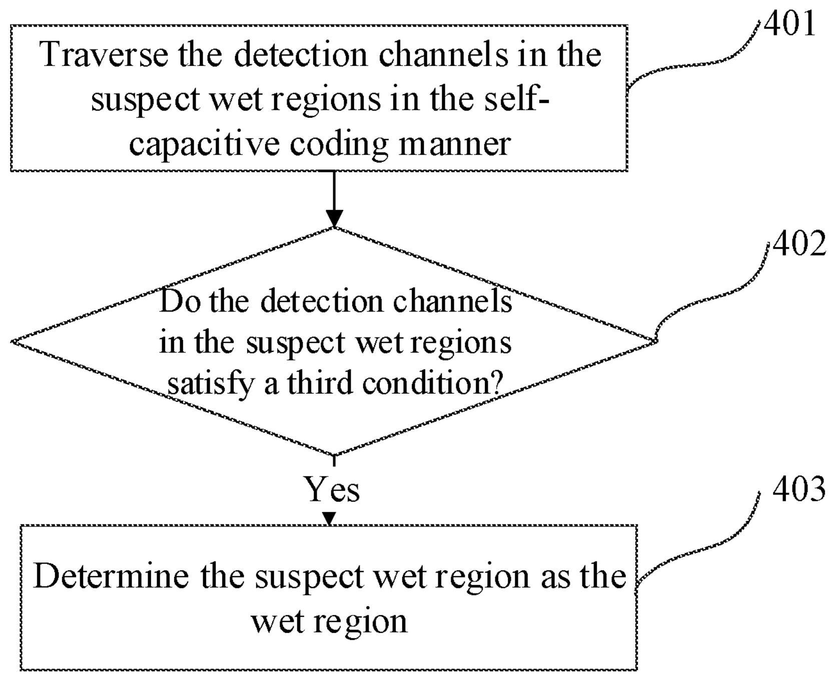
FIG. 4 is a flowchart of a finger positioning method on a touch panel in a wet state according to a third embodiment of the present application.

It should be noted that, in the embodiment as illustrated in FIG. 4 hereinafter, the manner of excluding the pseudo-wet regions herein may also be referenced to further exclude regions similar to the pseudo-wet regions from the suspect wet regions.

In this embodiment, during judging whether the regions are suspect wet regions, the second condition used may be using the number of detection channels corresponding to the contiguous interval as the interval length, and the predetermined value range is a range of the number of detection channels that is determined empirically.

S304: The region where the detection channels corresponding to the contiguous interval satisfying the second condition are determined as the suspect wet region.

S305: It is determined that no suspect wet region is present on the touch panel, that is, no wet region is present on the touch panel.

As illustrated in FIG. 4, a flowchart of a method for determining a wet region on a touch panel according to a third embodiment of the present application is given. This embodiment illustrates how to exclude the pseudo-wet regions from the suspect wet regions so as to screen out the wet region. The technical solution according to this embodiment includes the following steps:

S401: The detection channels in the suspect wet region are traversed in the self-capacitive coding manner.

The absolute values of the feature data differences of the detection channels in the wet region on the touch panel in the self-capacitive coding manner are greater than those in the mutual-capacitive coding manner. For example, if the self-capacitive coding manner is continuously used, the absolute values of the feature data differences of the detection channels in the suspect wet regions on the touch panel are generally values in the range of 40 to 80. In step S401, if the mutual-capacitive coding manner is continuously used, the absolute values of the feature data differences of the detection channels in the suspect wet regions on the touch panel are values still in the range of 40 to 80. However, in step S401, if the self-capacitive coding manner is used, the absolute values of the feature data differences of the detection channels in the wet region on the touch panel are generally values in the range of 100 to 200. Therefore, in this embodiment, by using the self-capacitive coding manner, the wet region is further determined from the suspect wet region in the subsequent steps.

S402: Whether the detection channels in the suspect wet region satisfy a third condition is judged. If the third condition is satisfied, step S403 is performed; and otherwise, the suspect wet region is determined as the pseudo-wet region.

For example, whether the absolute values of the feature data differences of the detection channels on the touch panel are values in the range of 100 to 200 is judged. Alternatively, a value is selected from the range of 100 to 200 as a standard value, and the standard value is subtracted from the absolute values of the feature data differences of the detection channels on the touch panel. Further, whether the feature data differences are in a threshold range is judged, or this judgment method is similarly modified, which is not described herein any further. If the feature data differences are in the range of 100 to 200, it is determined that the third condition is satisfied. It is similar with respect to the scenario of judging whether the feature data differences are in the threshold range. The third condition may be judging whether the feature data differences of the detection channels are in the predetermined threshold range.

S403: The suspect wet region is determined as the wet region.

Figure 5:
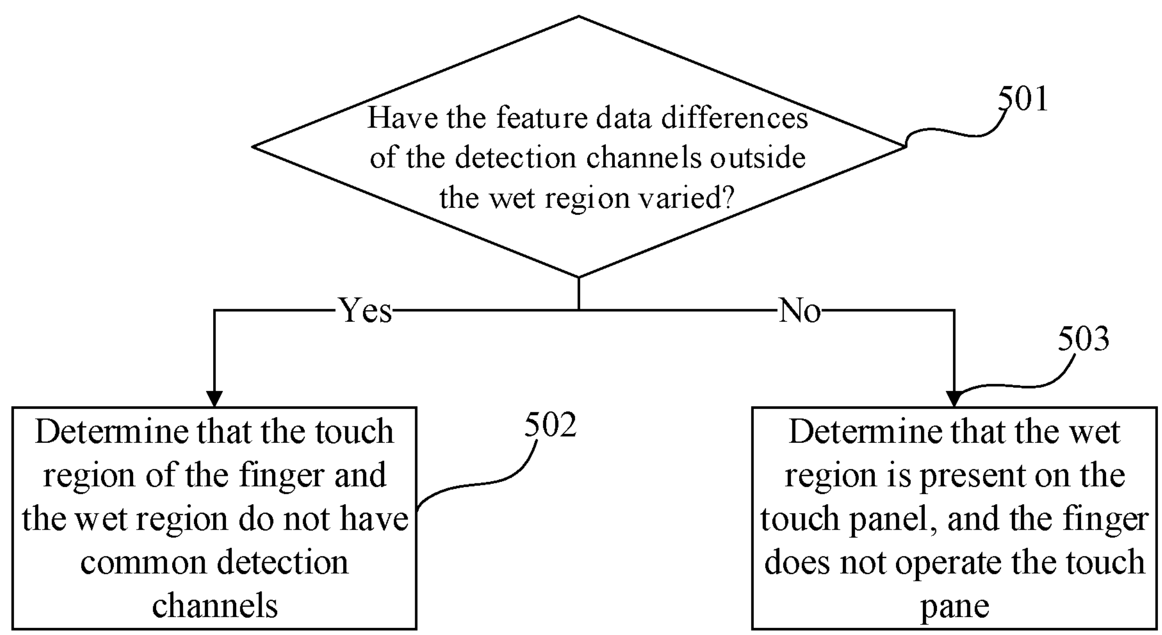
FIG. 5 is a flowchart of a method for determining a relative position relationship between a finger and a wet region in the case where a finger touch causes no impact onto feature data differences of detection channels in the wet region.

As illustrated in FIG. 5, a flowchart of a method for determining a relative position relationship between a finger and a wet region in the case where a finger touch causes no impact onto the feature data differences of the detection channels in the wet region is given, that is, the first condition is not satisfied. The method includes the following steps:

S501: Whether the feature data differences of the detection channels outside the wet region have varied is judged. If the feature data differences of the detection channels outside the wet region have varied, step S502 is performed; and if the feature data differences of the detection channels outside the wet region have not varied, step S503 is performed.

As known from the first embodiment, if the detection channels in the wet region do not satisfy the first condition, the feature data differences of all the detection channels in the wet region have not varied, that is, the finger causes no impact onto the detection channels in the wet region. Therefore, by further judging whether the feature data differences of the detection channels outside the wet region have varied in step S501, the relative position relationship between the finger and the wet region may be determined.

S502: It is determined that the touch region of the finger and the wet region do not have common detection channels, that is, as generally stated, the touch region of the finger and the wet region are not coaxial.

If the feature data differences of the detection channels outside the wet region have varied, the finger touch causes impacts onto the feature data differences of the detection channels outside the wet region, that is, the touch region of the finger and the wet region do not have the common detection channels, and the touch position of the finger is absolutely outside the wet region.

S503: It is determined that the wet region is present on the touch panel, and the finger does not operate the touch panel.

If the feature data differences of the detection channels outside the wet region have not varied, that is, the feature data differences of the detection channel in the regions outside the wet region have not varied, the finger does not touch the regions where the detection channels outside the wet region are located. In addition, through the above steps, it may be determined that the wet region is present on the touch panel. Therefore, it may be concluded that the touch region is present on the touch panel, and the finger does not operate the touch panel, including, no direct touch on the touch panel, and non-ignorable variations of the feature data differences caused by the finger floating over the touch panel.

Figure 6:
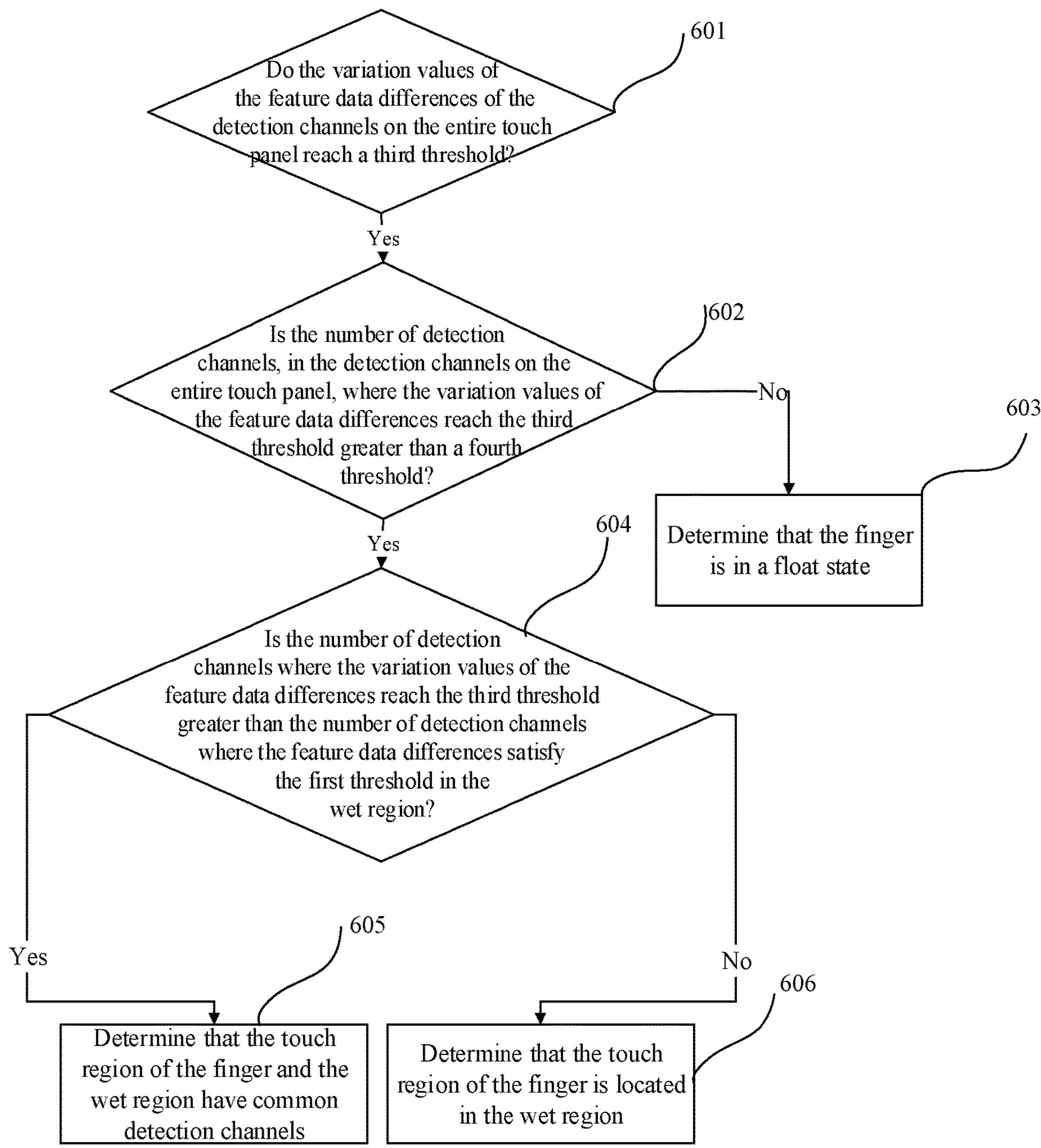
FIG. 6 is a flowchart of a method for determining a relative position relationship between a finger and a wet region in the case where a finger touch causes impacts onto feature data differences of detection channels in the wet region.

As illustrated in FIG. 6, a flowchart of a method for determining a relative position relationship between a finger and a wet region in the case where a finger touch causes impacts onto the feature data differences of the detection channels in the wet region in step S204 is given. The method includes the following steps:

S601: Whether the variation values of the feature data differences of the detection channels on the entire touch panel reach a third threshold is judged; and step S602 is performed if the variation values of the feature data differences of the detection channels on the entire touch panel reach the third threshold.

Since the wet region is present on the touch panel, and a normal region (that is, a region outside the wet region) are also present on the touch panel, the feature data differences of the detection channels in the wet region are different from those in the normal region under the two self-capacitive coding manners. For example, under the two self-capacitive coding manners, the absolute values of the feature data differences of the detection channels in the wet region are greater relative to the absolute values of the feature data differences of the detection channels in the normal region. However, under impacts caused by the finger, under the two self-capacitive coding manners, the variation values of the feature data differences of the detection channels in these regions are substantially the same. Therefore, the regions that are affected by the finger are determined by judging the variation values (including the variation values of the feature data differences of the detection channels in the wet region and the variation values of the feature data differences of the detection channel in the normal region) of the feature data differences of the detection channels on the entire touch panel. The third threshold herein is an empirical value. During practice of the present application, the inventors define the third threshold by comparing for multiple times the variation values of the feature data differences of the detection channels in the wet region and the normal region before the finger touch and the variation values of the feature data differences of the detection channels in the wet region and the normal region after the finger touch. If there are detection channels, in the detection channels of the entire touch panel, where the variation values of the feature data differences reach the third threshold, it indicates that the presence of the finger causes impacts onto the feature data differences of the detection channels in the region.

S602: Whether the number of detection channels, in the detection channels on the entire touch panel, where the variation values of the feature data differences reach the third threshold is greater than a fourth threshold is judged. If the number of detection channels, in the detection channels on the entire touch panel, where the variation values of the feature data differences reach the third threshold is greater than the fourth threshold, step S604 is performed; and if the number of detection channels, in the detection channels on the entire touch panel, where the variation values of the feature data differences reach the third threshold is less than or equal to the fourth threshold, step S603 is performed.

In practical application, if such case is existent, when the finger approaches the touch panel but is not in contact with the touch panel, that is, the finger is in a float state, impacts may also be caused to the feature data differences of the detection channels on the touch panel. However, the number of detection channels that are affected by the finger in the float state is far less than the number of detection channels that are affected by the finger in contact with the touch panel. Since the distance between two adjacent channels on the touch panel is small, when the finger is in contact with and touches the touch panel, it is unlikely the feature data differences of only a small number of channels vary. This is why, in the second embodiment, only the detection channel where the absolute value of the feature data difference is greater than a fifth threshold may be considered as the detection channel in the suspect wet regions, the detection channels where the feature data differences have the alternate positive and negative values are searched for towards two sides with the detection channel as a central channel, a numerical interval of the feature data differences of the detection channels having the alternate positive and negative values is output, and the region where the detection channels corresponding to the contiguous interval satisfying the second condition are located is determined as the suspect wet region. When the finger is in the float state, the finger causes impacts onto only a small number of channels on the touch panel. A value range of the number of channels where the variation values of the feature data differences of the detection channels on the touch panel when the finger is in the float state reach the third threshold is determined trough multiple trials or tests, and a value is selected from the value rang and used as the fourth threshold. If the number of detection channels, in the detection channels on the entire touch panel, where the variation values of the feature data differences is less than or equal to the fourth threshold, it is determined that the finger is in the float state. If the number of detection channels, in the detection channels on the entire touch panel, where the variation values of the feature data differences is greater the fourth threshold, it is determined that the finger touches the touch panel.

S603: It is determined that the finger is in a float state.

If the number of detection channels, in the detection channels on the entire touch panel, where the variation values of the feature data differences is less than or equal to the fourth threshold, that is, the finger does not touch the touch panel, since it is determined through the above step that the feature data differences of the detection channels in the wet region have varied, it may be concluded that the finger is in the float state.

S604: Whether the number of detection channels where the variation values of the feature data differences reach the third threshold is greater than the number of detection channels where the feature data differences satisfy the first threshold in the wet region is judged; if the number of detection channels where the variation values of the feature data differences reach the third threshold is greater than the number of detection channels where the feature data differences satisfy the first threshold in the wet region, step S605 is performed; and if the number of detection channels where the variation values of the feature data differences reach the third threshold is less than or equal to the number of detection channels where the feature data differences satisfy the first threshold in the wet region, step S606 is performed.

Since it is judged through step S203 that the detection channels in the wet region satisfy the first condition, it may be determined that the finger touches the touch panel and thus causes impacts onto the feature data differences of the detection channels in the wet region. If the number of detection channels where the variation values of the feature data differences reach the third threshold is greater than the number of detection channels where the feature data differences satisfy the first threshold in the wet region, it is determined that the touch by the finger causes impacts onto the feature data differences of both the detection channels in the wet region and the detection channels outside the wet region. If the number of detection channels where the variation values of the feature data differences reach the third threshold is less than or equal to the number of detection channels where the feature data differences satisfy the first threshold in the wet region, it is determined that the touch by the finger only causes impacts onto the detection channels in the wet region.

For example, assume that the number of detection channels where the feature data differences satisfy the first threshold in the wet region is 8, and the number of detection channels where the variation values of the feature data differences reach the third threshold is 9 which is greater than 8, then eight channels among the nine channels are practically located in the wet region, and thus the touch position of the finger partially overlaps the wet region; and assume that the number of detection channels where the feature data differences satisfy the first threshold in the wet region is 8, and the number of detection channels where the variation values of the feature data differences reach the third threshold is 6 which is less than 8, then the six channels are all located in the wet region, and thus the touch position of the finger is totally located in the wet region.

S605: It is determined that the touch region of the finger and the wet region have common detection channels, that is, as generally stated, the touch region of the finger and the wet region are coaxial.

S606: It is determined that the touch region of the finger is located in the wet region.

This embodiment achieves the same technical effect as the above embodiment, which is thus not described herein any further.

Figure 7:
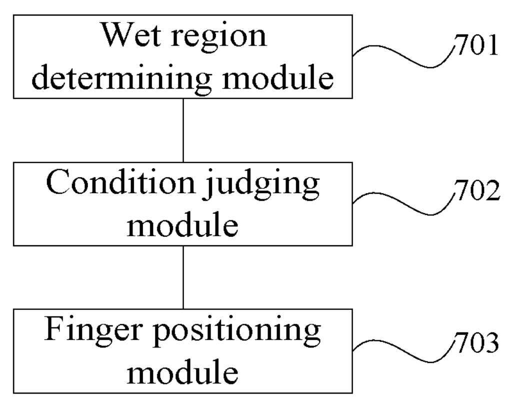
FIG. 7 is a schematic structural diagram of a finger positioning apparatus on a touch panel in a wet state according to an embodiment of the present application.

As illustrated in FIG. 7, a schematic structural diagram of a finger positioning apparatus on a touch panel in a wet state according to an embodiment of the present application is given. The finger positioning apparatus on a touch panel in a wet state according to this embodiment includes: a wet region determining module 701, a condition judging module 702 and a finger positioning module 703.

The wet region determining module 701 is configured to search out suspect wet regions in a spacing coding manner, and determine a wet region from the suspect wet regions in a self-capacitive coding manner.

The condition judging module 702 is configured to traverse detection channels on the entire touch panel in the self-capacitive coding manner, and judge whether the detection channels in the wet region satisfy a first condition.

The finger positioning module 703 is configured to: if the detection channels in the wet region satisfy the first condition, determine a relative position relationship between a touch position of a finger and the wet region according to variations of feature data differences of the detection channels on the entire touch panel; or if the detection channels in the wet region do not satisfy the first condition, determine a relative position relationship between a touch position of a finger and the wet region according to variations of feature data differences of the detection channels outside the wet region.

In a specific embodiment of the present application, the wet region determining module is specifically configured to:

perform the spacing coding for drive channels on the touch panel in a mutual-capacitive coding manner, screen out a contiguous interval having alternate positive and negative values from received feature data differences, and determine a region where the detection channels corresponding to the contiguous interval are located as the suspect wet region if an interval length of the contiguous interval satisfies a predetermined second condition.

In a specific embodiment of the present application, the wet region determining module is specifically configured to:

traverse the detection channels in the suspect wet region in the self-capacitive coding manner, judge, via the condition judging module, whether absolute values of the feature data differences corresponding to the detection channels in the suspect wet region satisfy a predetermined third condition, and determine the suspect wet region as the wet region if the absolute values satisfy the predetermined third condition.

In a specific embodiment of the present application, the condition judging module is further configured to judge, in the wet region, the number of detection channels where the feature data differences corresponding to the detection channels satisfy a first threshold is greater than a second threshold.

In a specific embodiment of the present application, the determining, by the fingerprint positioning module, a relative position relationship between a touch position of a finger and the wet region according to variations of feature data differences of the detection channels outside the wet region includes:

judging, by the condition judging module, whether the feature data differences of the detection channels outside the wet region have varied; and determining that the touch region of the finger and the wet region do not have common detection channels if the feature data differences of the detection channels outside the wet region have varied; or determining that a wet region is present on the touch panel and the finger does not perform any operation on the touch panel if the feature data differences of the detection channels outside the wet region have not varied.

In a specific embodiment of the present application, the determining, by the fingerprint positioning module, a relative position relationship between a touch position of a finger and the wet region according to variations of feature data differences of the detection channels outside the wet region includes:

traversing, by the wet region determining module, the detection channels on the entire touch panel, and determining the relative position relationship between the touch position of the finger and the wet region according to a magnitude comparison between the number of detection channels, in the detection channels on the entire touch panel, where variation values of the feature data differences reach a third threshold, and a fourth threshold.

In a specific embodiment of the present application, the determining, by the finger positioning module, the relative position relationship between the touch position of the finger and the wet region according to a magnitude comparison between the number of detection channels, in the detection channels on the entire touch panel, where variation values of the feature data differences reach a third threshold, and a fourth threshold includes:

determining that the finger is in a float state if the number of detection channels where the variation values of the feature data differences reach the third threshold is less than the fourth threshold; or determining the relative position relationship between the touch position of the finger and the wet region further according to a magnitude comparison between the number of detection channels where the variation values of the feature data differences reach the third threshold and the number of detection channels where the feature data differences satisfy the first threshold in the wet region if the number of detection channels where the variation values of the feature data differences reach the third threshold is greater than or equal to the fourth threshold.

In a specific embodiment of the present application, the finger positioning module is further configured to determine that no suspect wet region is present on the touch panel if the interval length of the contiguous interval satisfies the predetermined second condition.

In a specific embodiment of the present application, the performing, by the wet region determining module, the spacing coding for drive channels on the touch panel includes:

positively coding an odd-numbered drive channel on the touch panel, and not coding an even-numbered drive channel on the touch panel; or positively coding an even-numbered drive channel on the touch panel, and not coding an odd-numbered drive channel on the touch panel.

In a specific embodiment of the present application, the received feature data differences are positive values if the drive channel that is positively coded is in the wet region, or the received feature data differences are negative values if the drive channel that is not coded is in the wet region.

In a specific embodiment of the present application, the screening out, by the wet region determining module, a contiguous interval having alternate positive and negative values from received feature data differences includes:

screening out a detection channel where the absolute value of the feature data difference is greater than a fifth threshold from the detection channels corresponding to the received feature data differences, searching towards two sides with the screened detection channel as a central channel, the detection channels where the feature data differences have the alternate positive and negative values, and outputting a numerical interval of the feature data differences of the detection channels having the alternate positive and negative values.

The finger positioning apparatus on a touch panel in a wet state according to the above embodiment of the present application is capable of achieving the same technical effect as the method embodiment, which is not described herein any further.

Figure 8:
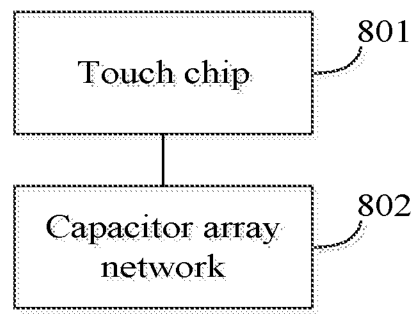
FIG. 8 is a schematic diagram of a touch detection apparatus according to an embodiment of the present application.

As illustrated in FIG. 8, a schematic diagram of a finger positioning apparatus on a touch panel in a wet state according to an embodiment of the present application is given. The finger positioning apparatus on a touch panel in a wet state according to this embodiment includes a touch chip 801 and a capacitor array network 802. The touch chip 801 is configured to: search out suspect wet regions in a spacing coding manner, and determine a wet region from the suspect wet regions in a self-capacitive coding manner; traverse detection channels on the capacitor array network in the self-capacitive coding manner, and judge whether the detection channels in the wet region satisfy a first condition; and if the detection channels in the wet region satisfy the first condition, determine a relative position relationship between a touch position of a finger and the wet region according to variations of feature data differences of the detection channels on the entire touch panel; or if the detection channels in the wet region do not satisfy the first condition, determine a relative position relationship between a touch position of a finger and the wet region according to variations of feature data differences of the detection channels outside the wet region.

Further, in this embodiment or in other embodiment, the touch chip 801 is further configured to perform the spacing coding for drive channels on the capacitor array network in a mutual-capacitive coding manner, screen out a contiguous interval having alternate positive and negative values from received feature data differences, and determine a region where the detection channels corresponding to the contiguous interval are located as the suspect wet region if an interval length of the contiguous interval satisfies a predetermined second condition.

Further, in this embodiment or in other embodiment, the touch chip 801 is further configured to traverse the detection channels in the suspect wet region in the self-capacitive coding manner, judge whether absolute values of the feature data differences corresponding to the detection channels in the suspect wet region satisfy a predetermined third condition, and determine the suspect wet region as the wet region if the absolute values satisfy the predetermined third condition.

Further, in this embodiment or in other embodiment, the touch chip 801 is further configured to traverse the detection channels in the wet region in the self-capacitive coding manner, and judge, in the wet region, the number of detection channels where the feature data differences corresponding to the detection channels satisfy a first threshold is greater than a second threshold.

Further, in this embodiment or in other embodiment, the touch chip 801 is further configured to: judge whether the feature data differences of the detection channels outside the wet region have varied; and determine that the touch region of the finger and the wet region do not have common detection channels if the feature data differences of the detection channels outside the wet region have varied; or determine that a wet region is present on the touch panel and the finger does not perform any operation on the touch panel if the feature data differences of the detection channels outside the wet region have not varied.

Further, in this embodiment or in other embodiment, the touch chip 801 is further configured to traverse the detection channels on the capacitor array network, and determine the relative position relationship between the touch position of the finger and the wet region according to a magnitude comparison between the number of detection channels, in the detection channels on the entire touch panel, where variation values of the feature data differences reach a third threshold, and a fourth threshold.

Further, in a specific embodiment of the present application, the determining, by the touch chip 801 the relative position relationship between the touch position of the finger and the wet region according to a magnitude comparison between the number of detection channels, in the detection channels on the entire touch panel, where variation values of the feature data differences reach a third threshold, and a fourth threshold includes:

determining that the finger is in a float state if the number of detection channels where the variation values of the feature data differences reach the third threshold is less than the fourth threshold; or determining the relative position relationship between the touch position of the finger and the wet region further according to a magnitude comparison between the number of detection channels where the variation values of the feature data differences reach the third threshold and the number of detection channels where the feature data differences satisfy the first threshold in the wet region if the number of detection channels where the variation values of the feature data differences reach the third threshold is greater than or equal to the fourth threshold.

Further, in this embodiment or in other embodiment, the touch chip 801 is further configured to screen out a detection channel where the absolute value of the feature data difference is greater than a fifth threshold from the detection channels corresponding to the received feature data differences, search towards two sides with the screened detection channel as a central channel, the detection channels where the feature data differences have the alternate positive and negative values, and output a numerical interval of the feature data differences of the detection channels having the alternate positive and negative values.

Figure 9:
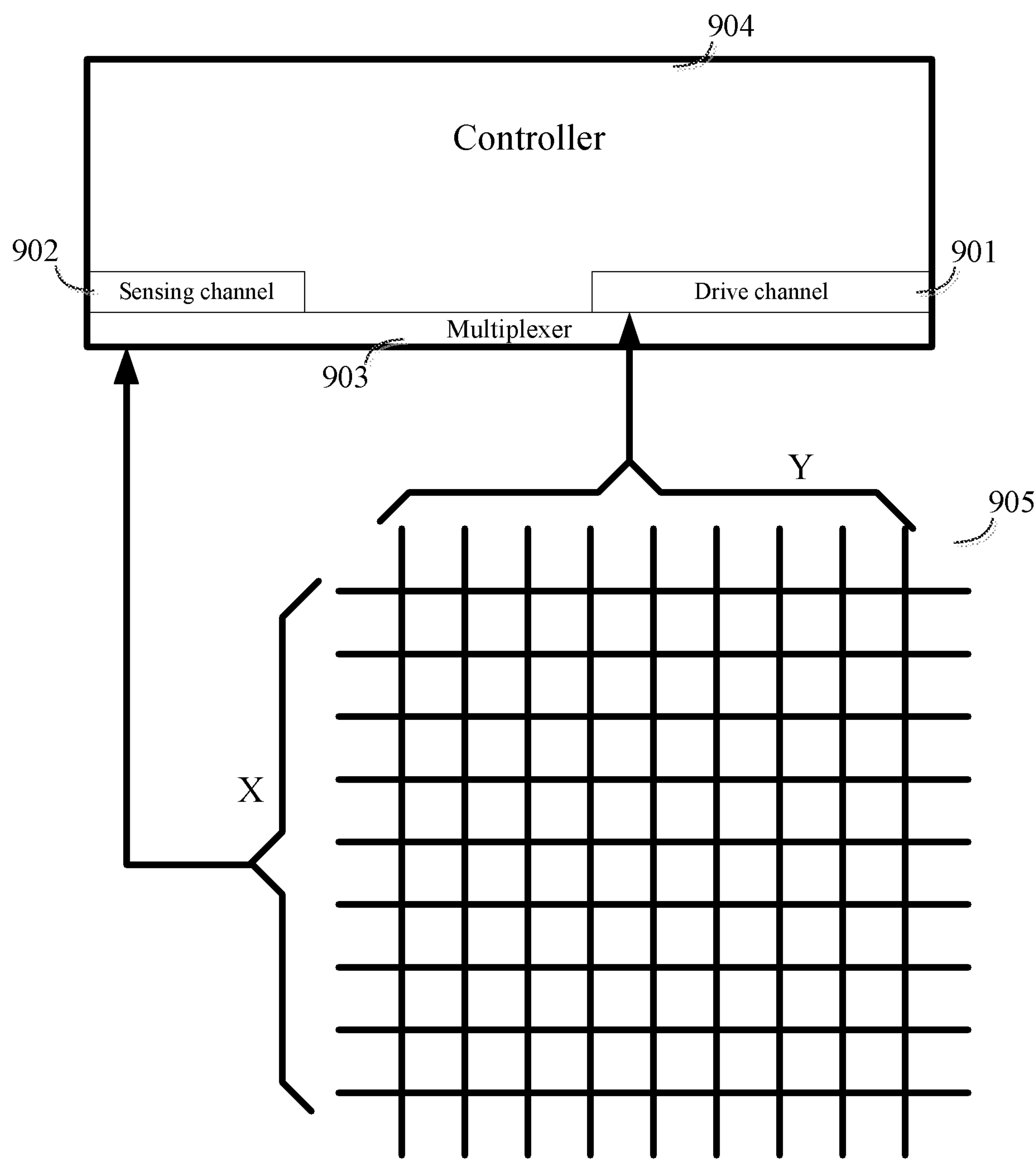
FIG. 9 is a schematic structural diagram of a touch detection apparatus according to an embodiment of the present application.

As illustrated in FIG. 9, a schematic structural diagram of a finger positioning apparatus on a touch panel in a wet state according to an embodiment of the present application is given. The finger positioning apparatus on a touch panel in a wet state includes: a drive channel 901, a sensing channel 902, a multiplexer 903, a processor 904 and a capacitor array network 905. The drive channel 901 provides a driving signal for a coupling capacitor. The sensing channel 902 is configured to receive an output signal of the coupling capacitor. The multiplexer 903 is configured to enable a plurality of coupling capacitors to multiplex the same drive channel 901 or the same sensing channel 902. The processor 904 is configured to obtain a feature data difference by statistical collection on sample feature data output by the coupling capacitors in spacing coding and self-capacitive coding, and acquire a real-time feature data difference of each sensing channel on the capacitor array network 905, judging whether the corresponding coupling capacitor is in a wet state according to a reference feature data difference measured in different driving modes, and determine a relative position relationship between a finger and the coupling capacitor in the wet state.

The electronic apparatus in the embodiments of the present application is practiced in various forms, including, but not limited to:

(1) a mobile communication device: which has the mobile communication function and is intended to provide mainly voice and data communications; where such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device; and (4) a server: which provides services for computers, and includes a processor 810, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device;

(5) other electronic devices having the data interaction function.

The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present disclosure without paying any creative effort.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like), and the like. The computer software product includes several instructions for instructing a computer device (which may be a personal computer, a server, or a network device) to perform all the embodiments or some parts of the embodiments.

Finally, it should be noted that the above embodiments are merely intended to describe the technical solutions of the embodiments of the present application, instead of limiting the present application. Although the present application is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present application.

A person skilled in the art shall understand that the embodiments may be described to illustrate methods, apparatuses (devices), or computer program products. Therefore, hardware embodiments, software embodiments, or hardware-plus-software embodiments may be used to illustrate the embodiments of the present application. In addition, the embodiments of the present application may further employ a computer program product which may be implemented by at least one non-transitory computer-readable storage medium with an executable program code stored thereon. The computer-readable storage medium includes, but not limited to, a disk memory, a CD-ROM, and an optical memory.

The embodiments of the present application are described based on the flowcharts and/or block diagrams of the method, apparatus (device), and computer program product according to the embodiments of the present application. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a computer-readable memory capable of causing a computer or other programmable data processing devices to work in a specific mode, such that the instructions stored on the computer-readable memory implement a product including an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when being executed on the computer or the other programmable data processing devices, implement the specific functions in at least one process in the flowcharts and/or at least one block in the block diagrams.

What is claimed is:

1. A method for determining a position relationship between a touch position of a finger and a wet region on a capacitive touch panel in a wet state, comprising:

searching out a suspect wet region on the touch panel through interlaced driving of driving channels on the touch panel, and determining a wet region in the suspect wet region through self-capacitance driving;

traversing detection channels on the entire touch panel through self-capacitance driving, and judging whether the detection channels in the wet region satisfy a first condition; and if the detection channels in the wet region satisfy the first condition, determining the position relationship between a touch position of a finger and the wet region based on changes in differences between reference feature data and real-time feature data of the detection channels in the wet region; or if the detection channels in the wet region do not satisfy the first condition, determining the position relationship between the touch position of the finger and the wet region based on changes in differences between reference feature data and real-time feature data of the detection channels outside the wet region, wherein the searching out a suspect wet region on the touch panel through interlaced driving of driving channels on the touch panel comprises: screening out a continuous zone in which differences between reference feature data and real-time feature data of the detection channels responsive to the interlaced driving of the driving channels have alternate positive and negative values, and determining a region where the detection channels corresponding to the continuous zone are located as the suspect wet region when a size of the continuous zone satisfies a predetermined second condition; and wherein the traversing detection channels on the entire touch panel through self-capacitance driving, and judging whether the detection channels in the wet region satisfy a first condition comprises: traversing the detection channels in the wet region through self-capacitance driving, and determining whether a number of the detection channels in the wet region whose differences between reference feature data and real-time feature data satisfy a first threshold is greater than a second threshold.

2. The method according to claim 1, wherein the screening out a continuous zone in which differences between reference feature data and real-time feature data of the detection channels responsive to the interlaced driving of the driving channels have alternate positive and negative values comprises:

screening out a detection channel whose absolute value of the difference between reference feature data and real-time feature data is greater than a fifth threshold from the detection channels corresponding to the differences between reference feature data and real-time feature data, searching towards two sides with the detection channel that is screened out as a central channel, for detection channels whose differences between reference feature data and real-time feature data have alternate positive and negative values, and outputting a numerical range of the differences between reference feature data and real-time feature data of the detection channels having alternate positive and negative values.

3. The method according to claim 1, wherein the determining a wet region in the suspect wet region through self-capacitance driving comprises:

traversing the detection channels in the suspect wet region through self-capacitance driving, judging whether absolute values of the differences between reference feature data and real-time feature data of the detection channels in the suspect wet region fall in a threshold range, and determining the suspect wet region as the wet region if the absolute values fall in the threshold range.

4. The method according to claim 1, wherein the determining a position relationship between a touch position of a finger and the wet region based on changes in differences between reference feature data and real-time feature data of the detection channels outside the wet region comprises:

judging whether the differences between reference feature data and real-time feature data of the detection channels outside the wet region have varied; and determining that the touch region of the finger and the wet region do not have common detection channels if the differences between reference feature data and real-time feature data of the detection channels outside the wet region have varied; or determining that a wet region is present on the touch panel and the finger does not perform any operation on the touch panel if the differences between reference feature data and real-time feature data of the detection channels outside the wet region have not varied.

5. The method according to claim 1, wherein the determining the position relationship between the touch position of the finger and the wet region based on changes in differences between reference feature data and real-time feature data of the detection channels outside the wet region comprises:

traversing the detection channels on the entire touch panel, and determining the position relationship between the touch position of the finger and the wet region by comparing a number of detection channels on the entire touch panel whose changes in differences between reference feature data and real-time feature data reach a third threshold with a fourth threshold.

6. The method according to claim 5, wherein the determining the position relationship between the touch position of the finger and the wet region by comparing a number of detection channels on the entire touch panel whose changes in differences between reference feature data and real-time feature data reach a third threshold with a fourth threshold comprises:

determining that the finger is in a float state when the number of the detection channels on the entire touch panel whose changes in differences between reference feature data and real-time feature data reach a third threshold is less than the fourth threshold; and when the number of the detection channels on the entire touch panel whose changes in differences between reference feature data and real-time feature data reach a third threshold is greater than or equal to the fourth threshold, further determining the position relationship between the touch position of the finger and the wet region by comparing the number of the detection channels on the entire touch panel whose changes in differences between reference feature data and real-time feature data reach a third threshold with the number of the detection channels in the wet region whose differences between reference feature data and real-time feature data satisfy the first threshold.

7. An apparatus for determining a position relationship between a touch position of a finger and a wet region on a capacitive touch panel in a wet state, comprising: a wet region determining module, a condition judging module and a finger positioning module; wherein the wet region determining module is configured to search out a suspect wet region on the touch panel through interlaced driving of driving channels on the touch panel, and determine a wet region in the suspect wet region through self-capacitance driving;

the condition judging module is configured to traverse detection channels on the entire touch panel through self-capacitance driving, and judge whether the detection channels in the wet region satisfy a first condition; and the finger positioning module is configured to: if the detection channels in the wet region satisfy the first condition, determine the position relationship between a touch position of a finger and the wet region based on changes in differences between reference feature data and real-time feature data of the detection channels in the wet region; or if the detection channels in the wet region do not satisfy the first condition, determine the position relationship between the touch position of the finger and the wet region based on changes in differences between reference feature data and real-time feature data of the detection channels outside the wet region, wherein the searching out a suspect wet region on the touch panel through interlaced driving of driving channels on the touch panel by the wet region determining module comprises: screening out a continuous zone in which differences between reference feature data and real-time feature data of the detection channels responsive to the interlaced driving of the driving channels have alternate positive and negative values, and determining a region where the detection channels corresponding to the continuous zone are located as the suspect wet region when a size of the continuous zone satisfies a predetermined second condition; and wherein the traversing detection channels on the entire touch panel through self-capacitance driving, and judging whether the detection channels in the wet region satisfy a first condition by the condition judging module comprises: traversing the detection channels in the wet region through self-capacitance driving, and determining whether a number of the detection channels in the wet region whose differences between reference feature data and real-time feature data satisfy a first threshold is greater than a second threshold.

8. The apparatus according to claim 7, wherein the screening out, by the wet region determining module, a continuous zone in which differences between reference feature data and real-time feature data of the detection channels responsive to the interlaced driving of the driving channels have alternate positive and negative values comprises:

screening out a detection channel whose absolute value of the difference between reference feature data and real-time feature data is greater than a fifth threshold from the detection channels corresponding to the differences between reference feature data and real-time feature data, searching towards two sides with the detection channel that is screened out as a central channel, for detection channels whose differences between reference feature data and real-time feature data have alternate positive and negative values, and outputting a numerical range of the differences between reference feature data and real-time feature data of the detection channels having alternate positive and negative values.

9. The apparatus according to claim 7, where the wet region determining module is specifically configured to:

traverse the detection channels in the suspect wet region through self-capacitance driving, judge whether absolute values of the differences between reference feature data and real-time feature data of the detection channels in the suspect wet region fall in a threshold range, and determine the suspect wet region as the wet region if the absolute values fall in the threshold range.

10. The apparatus according to claim 7, wherein the determining, by the fingerprint positioning module, the position relationship between a touch position of a finger and the wet region based on changes in differences between reference feature data and real-time feature data of the detection channels outside the wet region comprises:

judging whether the differences between reference feature data and real-time feature data of the detection channels outside the wet region have varied; and determining that the touch region of the finger and the wet region do not have common detection channels if the differences between reference feature data and real-time feature data of the detection channels outside the wet region have varied; or determining that a wet region is present on the touch panel and the finger does not perform any operation on the touch panel if the differences between reference feature data and real-time feature data of the detection channels outside the wet region have not varied.

11. The apparatus according to claim 7, wherein the determining, by the fingerprint positioning module, the position relationship between the touch position of the finger and the wet region based on changes in differences between reference feature data and real-time feature data of the detection channels outside the wet region comprises:

traversing the detection channels on the entire touch panel, and determining the position relationship between the touch position of the finger and the wet region by comparing a number of detection channels on the entire touch panel whose changes in differences between reference feature data and real-time feature data reach a third threshold with a fourth threshold.

12. The apparatus according to claim 11, wherein the determining, by the finger positioning module, the position relationship between the touch position of the finger and the wet region by comparing a number of detection channels on the entire touch panel whose changes in differences between reference feature data and real-time feature data reach a third threshold with a fourth threshold comprises:

determining that the finger is in a float state when the number of the detection channels on the entire touch panel whose changes in differences between reference feature data and real-time feature data reach a third threshold is less than the fourth threshold; and when the number of the detection channels on the entire touch panel whose changes in differences between reference feature data and real-time feature data reach a third threshold is greater than or equal to the fourth threshold, further determining the position relationship between the touch position of the finger and the wet region by comparing the number of the detection channels on the entire touch panel whose changes in differences between reference feature data and real-time feature data reach a third threshold with the number of the detection channels in the wet region whose differences between reference feature data and real-time feature data satisfy the first threshold.

13. A touch detection apparatus for determining a position relationship between a touch position of a finger and a wet region on a capacitive touch panel in a wet state, the touch detection apparatus comprising: a touch chip and a capacitor array network; wherein the touch chip is configured to: search out a suspect wet region on the touch panel through interlaced driving of driving channels on the touch panel, and determine a wet region in the suspect wet region through self-capacitance driving;

traverse detection channels on the entire touch panel through self-capacitance driving, and judge whether the detection channels in the wet region satisfy a first condition; and if the detection channels in the wet region satisfy the first condition, determine the position relationship between a touch position of a finger and the wet region based on changes in differences between reference feature data and real-time feature data of the detection channels in the wet region; or if the detection channels in the wet region do not satisfy the first condition, determine the position relationship between the touch position of the finger and the wet region based on changes in differences between reference feature data and real-time feature data of the detection channels outside the wet region, wherein the searching out a suspect wet region on the touch panel through interlaced driving of driving channels on the touch panel by the touch chip comprises: screening out a continuous zone in which differences between reference feature data and real-time feature data of the detection channels responsive to the interlaced driving of the driving channels have alternate positive and negative values, and determining a region where the detection channels corresponding to the continuous zone are located as the suspect wet region when a size of the continuous zone satisfies a predetermined second condition; and wherein the traversing detection channels on the entire touch panel through self-capacitance driving, and judging whether the detection channels in the wet region satisfy a first condition by the touch chip comprises: traversing the detection channels in the wet region through self-capacitance driving, and determining whether a number of the detection channels in the wet region whose differences between reference feature data and real-time feature data satisfy a first threshold is greater than a second threshold.

14. The touch detection apparatus according to claim 13, wherein the touch chip is specifically configured to:

traverse the detection channels in the suspect wet region through self-capacitance driving, judge whether absolute values of the differences between reference feature data and real-time feature data of the detection channels in the suspect wet region fall in a threshold range, and determine the suspect wet region as the wet region if the absolute values fall in the threshold range.

15. The touch detection apparatus according to claim 13, wherein the touch chip is specifically configured to:

judge whether the differences between reference feature data and real-time feature data of the detection channels outside the wet region have varied; and determine that the touch region of the finger and the wet region do not have common detection channels if the differences between reference feature data and real-time feature data of the detection channels outside the wet region have varied; or determine that a wet region is present on the touch panel and the finger does not perform any operation on the touch panel if the differences between reference feature data and real-time feature data of the detection channels outside the wet region have not varied.

16. The touch detection apparatus according to claim 13, wherein the touch chip is specifically configured to:

traverse the detection channels on the entire touch panel, and determining the position relationship between the touch position of the finger and the wet region by comparing a number of detection channels on the entire touch panel whose changes in differences between reference feature data and real-time feature data reach a third threshold with a fourth threshold.

17. The touch detection apparatus according to claim 16, wherein the determining the position relationship between the touch position of the finger and the wet region by comparing a number of detection channels on the entire touch panel whose changes in differences between reference feature data and real-time feature data reach a third threshold with a fourth threshold comprises:

determining that the finger is in a float state when the number of the detection channels on the entire touch panel whose changes in differences between reference feature data and real-time feature data reach a third threshold is less than the fourth threshold; and when the number of the detection channels on the entire touch panel whose changes in differences between reference feature data and real-time feature data reach a third threshold is greater than or equal to the fourth threshold, further determining the position relationship between the touch position of the finger and the wet region by comparing the number of the detection channels on the entire touch panel whose changes in differences between reference feature data and real-time feature data reach a third threshold with the number of the detection channels in the wet region whose differences between reference feature data and real-time feature data satisfy the first threshold.

18. The touch detection apparatus according to claim 13, wherein the touch chip is specifically configured to:

screen out a detection channel whose absolute value of the difference between reference feature data and real-time feature data is greater than a fifth threshold from the detection channels corresponding to the differences between reference feature data and real-time feature data, searching towards two sides with the detection channel that is screened out as a central channel, for detection channels whose differences between reference feature data and real-time feature data have alternate positive and negative values, and outputting a numerical range of the differences between reference feature data and real-time feature data of the detection channels having alternate positive and negative values.

* * * * *